J. HUGHES.

Locomotive Smoke-Stacks.

No. 6,156. Reissued Dec. 1, 1874.

Attest:
Peter B. Baskin
Edward Baldwin

Inventor:
James Hughes

THE GRAPHIC CO. PHOTO-LITH. 39 & 41 PARK PLACE, N.Y.

UNITED STATES PATENT OFFICE.

JAMES HUGHES, OF SCRANTON, PENNSYLVANIA.

IMPROVEMENT IN LOCOMOTIVE SMOKE-STACKS.

Specification forming part of Letters Patent No. 142,851, dated September 16, 1873; reissue No. 6,156, dated December 1, 1874; application filed July 31, 1874.

*To all whom it may concern:*

Be it known that I, JAMES HUGHES, of the city of Scranton, in the county of Luzerne and State of Pennsylvania, have invented a new and Improved Cone for Locomotive Smoke-Stacks, of which the following is a full, clear, and exact description of the construction and operation.

Figure 1:
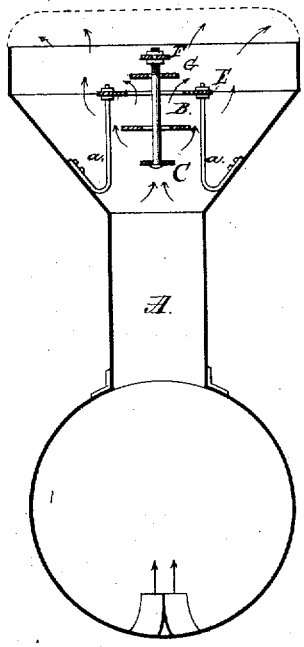
Figure 2:
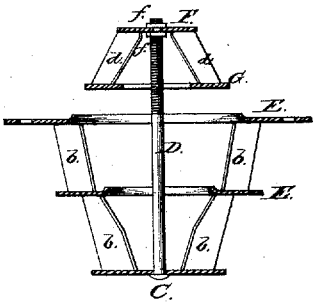

In the accompanying drawings, Figure 1 represents a vertical central section of a locomotive smoke-stack with my improved cone. Fig. 2 is a vertical central section of the compound cone.

Similar letters of reference indicate corresponding parts.

The object of my invention is to provide for the smoke-stacks of locomotives an improved cone, by which the draft is increased, and the rapid wearing out of the stack by the exhaust steam and accompanying ashes and cinders is prevented.

In cones hitherto used the exhaust steam and cinders strike the cone, then spread out and strike the sides of the smoke-stack with full force. The steam then escapes along the circumference of the netting or bonnet, leaving the central part inoperative, and creating a partial vacuum, which is detrimental to the draft, as it tends to prevent the free escape of the steam.

My invention, instead of being formed of a cone of one continuous surface, consists of flat plates and rings of various sizes, which are placed one above another, in such a manner that the steam cannot pass through without striking the plates and rings, varying thereby the direction of the steam, and distributing it equally, so that it will pass out of the stack without impinging on the sides of the same, and thus bringing the whole surface of the bonnet into use.

The invention comprises a main or fixed cone and an adjustable supplemental cone, which is located directly above it, and used in locomotives having a very strong draft.

In the drawing, A represents the smoke-stack of the locomotive; B, the cone, which is attached to the upper bulging part of the same by the supporting rods or braces *a a*, which may be applied in any suitable manner. The cone B consists of one or more circular plates, C, with one or more rings, E, of gradually-increasing diameter, which, by any suitable supports *b b*, are kept at any proper distance from and above each other. The inner edges of the rings E are turned up or flanged to facilitate the upward passage of the steam. The inverted or supplemental cone consists of the top disk F, of any suitable size, with the ring G connected by the arms *d d*. This cone is supported by the vertical standard D, which is secured at the bottom to the plate or plates C in cone B, and has a screw on the top, for the purpose of raising or lowering the disk F, to regulate the draft. The diameter of the ring G is smaller than the inner diameter of the uppermost ring E. The diameter of the upper ring of the cone B should be larger than that of the straight part of the smoke-stack, to prevent the direct impingement of the steam on the bonnet.

The operation of my improved cone is as follows, viz: The exhaust steam strikes the lower plate C of the cone B and ring E, passing through and around the rings E, as indicated by the arrows in Fig. 1, so that the steam is distributed uniformly over the bonnet, thereby increasing the draft.

Having thus described my invention, what I claim as new, and desire to secure by Letters Patent, is—

1. In locomotive spark and cinder arresters, the cone B, consisting of the disk C and rings E, combined and arranged substantially as described.

2. The cone B, consisting of disk C and rings E, and the supplemental cone, formed of disk F and ring G, all combined and arranged to interrupt and also direct the draft, as shown and described.

JAMES HUGHES.

Witnesses:
PETER B. BACKUS,
EDWARD BALDWIN.